(12) United States Patent
Tamura

(10) Patent No.: US 12,720,210 B2
(45) Date of Patent: Aug. 25, 2026

(54) SYSTEM CAPABLE OF CHANGING APERTURE VALUE OF DIAPHRAGM WITHIN LENS APPARATUS ON BOTH LENS SIDE AND CAMERA SIDE, PICKUP APPARATUS, LENS APPARATUS, CONTROL METHOD, AND STORAGE MEDIUM

(71) Applicant: CANON KABUSHIKI KAISHA, Tokyo (JP)

(72) Inventor: Yusuke Tamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 18/617,454

(22) Filed: Mar. 26, 2024

(65) Prior Publication Data

US 2024/0329493 A1 Oct. 3, 2024

(30) Foreign Application Priority Data

Mar. 30, 2023 (JP) ................................ 2023-055672

(51) Int. Cl.

| | |
|---|---|
| ***H04N 23/75*** | (2023.01) |
| ***G03B 7/01*** | (2021.01) |
| ***G03B 9/02*** | (2021.01) |
| ***H04N 23/63*** | (2023.01) |
| ***H04N 23/663*** | (2023.01) |
| ***H04N 23/667*** | (2023.01) |
| ***H04N 23/67*** | (2023.01) |

(52) U.S. Cl.

CPC ............... *H04N 23/75* (2023.01); *G03B 7/01* (2015.01); *H04N 23/634* (2023.01); *H04N 23/663* (2023.01); *H04N 23/667* (2023.01); *G03B 9/02* (2013.01); *H04N 23/67* (2023.01)

(58) Field of Classification Search

CPC .. H04N 23/634; H04N 23/663; H04N 23/667; H04N 23/75; G03B 7/01; G03B 9/02

See application file for complete search history.

(56) References Cited

U.S. PATENT DOCUMENTS 8,891,955 B2 * 11/2014 Whitham ............ H04N 23/743 396/222

2002/0071048 A1 * 6/2002 Kaneda ............... H04N 23/663 348/E5.04

FOREIGN PATENT DOCUMENTS

JP 2011232741 A 11/2011
JP 2021076807 A 5/2021

* cited by examiner

*Primary Examiner* — Daniel M Pasiewicz

(74) *Attorney, Agent, or Firm* — Canon U.S.A., Inc. IP Division

(57) ABSTRACT

The system has a camera and a lens unit, and in a first mode, a diaphragm of the lens unit is controlled such that an effective aperture value is a first aperture value set according to a user operation and in the camera, a photometric value is calculated from a frame image during a Live View operation in a state where an amount of light received is adjusted by the diaphragm.

16 Claims, 7 Drawing Sheets

Figure 3:
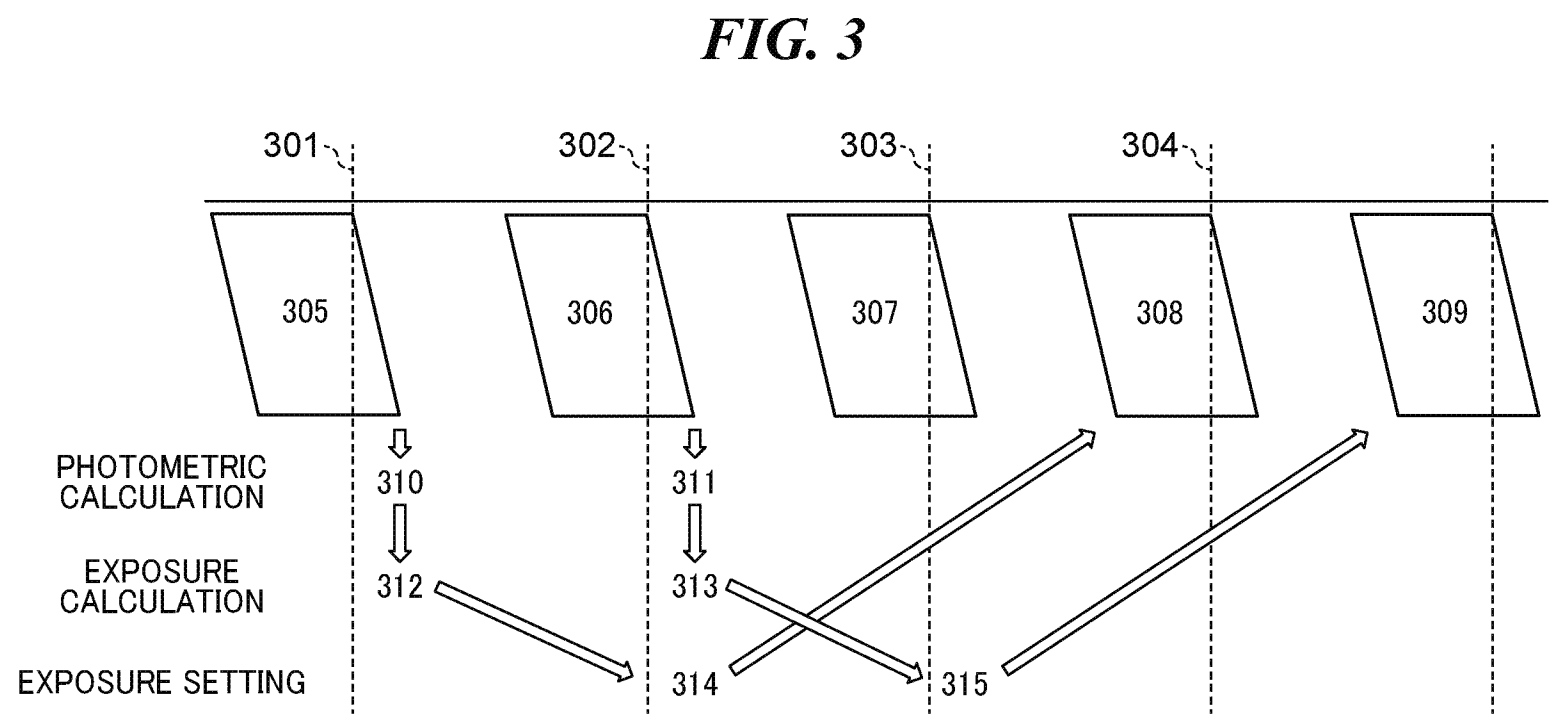

301
302
303
304
305
306
307
308
309
PHOTOMETRIC CALCULATION
310
311
EXPOSURE CALCULATION
312
313
EXPOSURE SETTING
314
315

Figure 6B:
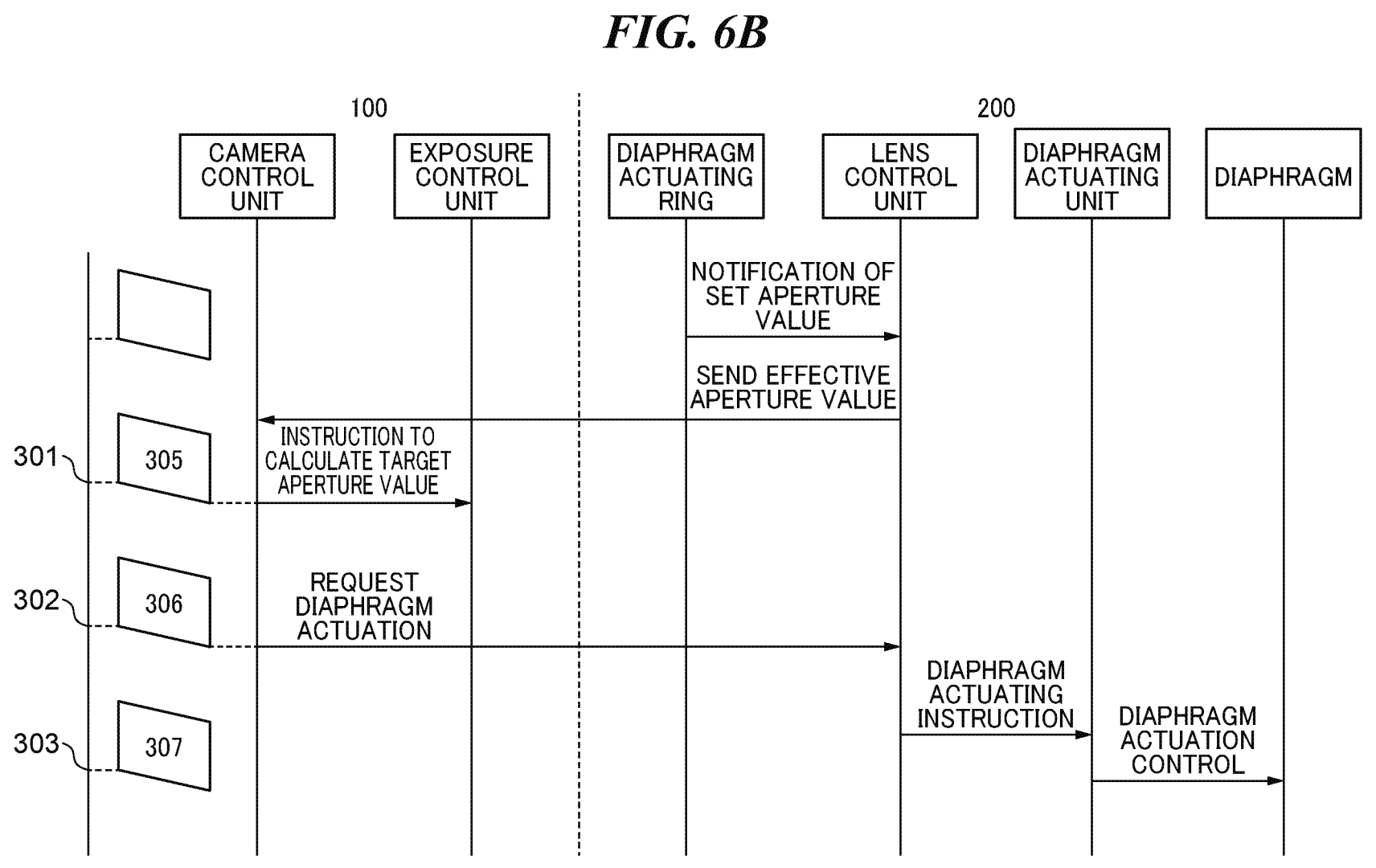

CAMERA CONTROL UNIT

EXPOSURE CONTROL UNIT

200

DIAPHRAGM ACTUATING RING

LENS CONTROL UNIT

DIAPHRAGM ACTUATING UNIT

DIAPHRAGM

NOTIFICATION OF SET APERTURE VALUE

SEND EFFECTIVE APERTURE VALUE

INSTRUCTION TO CALCULATE TARGET APERTURE VALUE

REQUEST DIAPHRAGM ACTUATION

DIAPHRAGM ACTUATING INSTRUCTION

DIAPHRAGM ACTUATION CONTROL

305

306

307

301

302

303

SYSTEM CAPABLE OF CHANGING APERTURE VALUE OF DIAPHRAGM WITHIN LENS APPARATUS ON BOTH LENS SIDE AND CAMERA SIDE, PICKUP APPARATUS, LENS APPARATUS, CONTROL METHOD, AND STORAGE MEDIUM

BACKGROUND

Technical Field

The aspect of the embodiments relates to a system, a pickup apparatus, a lens apparatus, a control method, and a storage medium, and in particular to a system that is capable of changing the aperture value of a diaphragm within the lens apparatus on both a lens side and a camera side, a pickup apparatus, the lens apparatus, a control method, and a storage medium.

Description of the Related Art

There are conventionally known camera systems in which the aperture value of a diaphragm within a lens apparatus can be set on both a lens side and a camera side. Generally, in a camera system including a lens equipped with no member for setting an aperture value, a user cannot directly change an aperture value setting on the lens side. Thus, the camera side and the lens side communicate with each other, and the lens side actuates the diaphragm based on a diaphragm actuating instruction from the camera side. On the other hand, in a camera system including a lens equipped with a member for setting an aperture value, a user can directly change an aperture value setting on the lens side by operating the member. When the aperture value setting is thus directly changed on the lens side, the diaphragm is actuated immediately in response to the change in the aperture value setting made by the user on the lens side without the above-mentioned camera-lens communication, and hence the diaphragm is actuated in a responsive manner. For this reason, in a shooting mode like a movie mode in which a process of changing scenes is recorded by continuously recording successively-shot images, it is useful to change an aperture value setting in a responsive manner from the lens side as described above.

In a shooting mode like a still image mode in which an image is singly recorded, an auto focus detection process is usually performed by a user operation such as half-pressing of a release button so as to record an in-focus still image when shooting.

For example, Japanese Laid-Open Patent Publication (Kokai) No. 2011-232741 proposes a technique in which the focus of an image pickup optical system is detected using a plurality of focus detection pixels which an image sensor has and which photoelectrically converts an image formed by a bundle of rays split from a bundle of rays from a lens (image plane phase difference AF). Specifically, according to Japanese Laid-Open Patent Publication (Kokai) No. 2011-232741, a phase difference between a pair of images is detected based on digital signals from the focus detection pixels, and the focus of the image pickup optical system is detected based on the detected phase difference.

Japanese Laid-Open Patent Publication (Kokai) No. 2021-76807 proposes a technique in which when an aperture value is set on the lens side by a user, control is performed such that the aperture value set on the lens side by the user cannot be changed even in a shooting mode in which the camera automatically determines an aperture value. This reduces the possibility that the user will be confused about changing of an aperture value.

However, it is known that in the focus detection process using the imaging face phase-difference AF described in Japanese Laid-Open Patent Publication (Kokai) No. 2011-232741, the focus detection accuracy usually decreases when the aperture is small. For this reason, when an aperture value for a small aperture is set on the lens side by a user, the focus detection accuracy will decrease to cause an out-of-focus still image to be shot if the imaging face phase-difference AF is performed with an aperture value being fixed to the aperture value set on the lens side by the user as described in Japanese Laid-Open Patent Publication (Kokai) No. 2021-76807.

Likewise, in a flicker detection process, the flicker detection accuracy usually decreases when the aperture is small. For this reason, when an aperture value for a small aperture is set on the lens side by the user, the focus detection accuracy will decrease if the flicker detection process is performed with an aperture value being fixed to the aperture value set on the lens side by the user as described in Japanese Laid-Open Patent Publication (Kokai) No. 2021-76807.

SUMMARY

According to an aspect of the embodiments, there is provided a system comprising a lens apparatus and a pickup apparatus that are capable of communicating with each other, wherein the lens apparatus comprises a diaphragm that adjusts the amount of light during shooting with the pickup apparatus, and the pickup apparatus comprises sensor, the lens apparatus further comprising a setting member that sets a first aperture value according to a user operation, at least one processor, and a memory coupled to the at least one processor, the memory having instructions that, when executed by the at least one processor, perform the operations as an aperture control unit that controls the diaphragm such that in a first mode, an effective aperture value is the first aperture value, the pickup apparatus further comprising at least one processor, and a memory coupled to the at least one processor, the memory having instructions that, when executed by the at least one processor, perform the operations as an image obtaining unit that obtains a frame image by taking an image of a subject with the sensor during a Live View operation in a state where the amount of light received is adjusted by the diaphragm, a photometric value calculation unit that calculates a photometric value from the frame image, an aperture value calculation unit that calculates an aperture value according to the photometric value, a determination unit that determines whether a control subject is the lens apparatus or the pickup apparatus according to a shooting mode during the Live View operation, a transition unit that, in a case where the determined diaphragm control subject is the pickup apparatus, determines an aperture value calculated by the aperture value calculation unit as a second aperture value, and transitions the lens apparatus to a second mode, and a forced control unit that, in a case where the transition unit transitions the lens apparatus to the second mode, forcibly controls the aperture control unit such that the effective aperture value is not the first aperture value but the determined second aperture value.

According to an aspect of the embodiments, there is provided a pickup apparatus that connects to a lens apparatus such that they are able to communicate with each other, wherein the pickup apparatus comprises a sensor, and the lens apparatus comprises a diaphragm that adjusts an amount of light during shooting with the pickup apparatus, and in a first mode, controls the diaphragm such that an effective aperture value of the diaphragm is a first aperture value that is set according to a user operation, the pickup apparatus comprising at least one processor, and a memory coupled to the at least one processor, the memory having instructions that, when executed by the at least one processor, perform the operations as an image obtaining unit that obtains a frame image by taking an image of a subject with the sensor during a Live View operation in a state where the amount of light received is adjusted by the diaphragm, a photometric value calculation unit that calculates a photometric value from the frame image, an aperture value calculation unit that calculates an aperture value according to the photometric value, a determination unit that determines whether a control subject is the lens apparatus or the pickup apparatus according to a shooting mode during the Live View operation, a transition unit that, when the determined control subject is the pickup apparatus, determines an aperture value calculated by the aperture value calculation unit as a second aperture value, and transitions the lens apparatus to a second mode, and a forced control unit that, when the transition unit transitions the lens apparatus to the second mode, forcibly controls the lens apparatus such that the effective aperture value is not the first aperture value but the determined second aperture value.

According to an aspect of the embodiments, there is provided a lens apparatus that connects to a pickup apparatus lens apparatus such that they are able to communicate with each other, wherein the lens apparatus comprises a diaphragm that adjusts the amount of light during shooting with the pickup apparatus, and the pickup apparatus comprises a sensor that obtains a frame image by taking an image of a subject during a Live View operation in a state where the amount of light received is adjusted by the diaphragm, the lens apparatus further comprising a setting member that sets a first aperture value according to a user operation, at least one processor, and a memory coupled to the at least one processor, the memory having instructions that, when executed by the at least one processor, perform the operations as an aperture control unit that controls the diaphragm such that in a first mode, an effective aperture value is the first aperture value, wherein in a case where the lens apparatus is transitioned to the second mode according to an instruction from the pickup apparatus according to a shooting mode during the Live View operation, the aperture control unit is forcibly controlled by the pickup apparatus such that the effective aperture value is not the first aperture value but the second aperture value determined by the pickup apparatus.

Further features of the disclosure will become apparent from the following description of exemplary embodiments (with reference to the attached drawings).

BRIEF DESCRIPTION OF THE DRAWINGS

FIG. 1 is a block diagram showing a hardware configuration of a camera system according to each exemplary embodiment.

FIG. 3 is a view useful in explaining an image taking operation in Live View of a camera in FIG. 1 according to each exemplary embodiment.

FIG. 6B is a sequence diagram of a diaphragm actuation control process in the camera system in a case where the aperture control subject is set to the camera in the aperture control subject determination process in FIG. 5.

DESCRIPTION OF THE EMBODIMENTS

Figure 2:
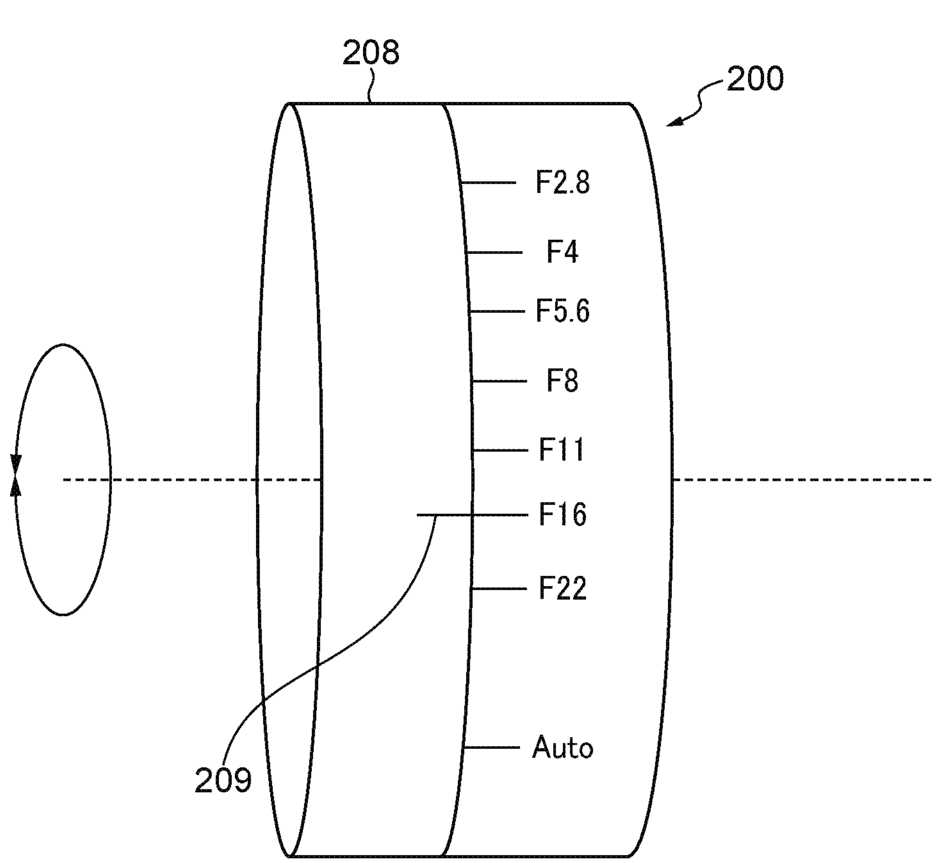
FIG. 2 is an external view of a lens unit that has a diaphragm actuating ring in FIG. 1.

Exemplary embodiments of the disclosure will now be described in detail with reference to the accompanying drawings showing an embodiment thereof.

Exemplary embodiments of the disclosure will be described in detail below with reference to the accompanying drawings. The following exemplary embodiments do not limit the disclosure within the scope of the appended claims. Although a plurality of features is described in the exemplary embodiments, not all of the plurality of features is indispensable to the disclosure, and the plurality of features may be combined in an arbitrary way. In the accompanying drawings, identical or similar components are assigned the same reference numerals, and the redundant descriptions will be omitted.

Figure 1:
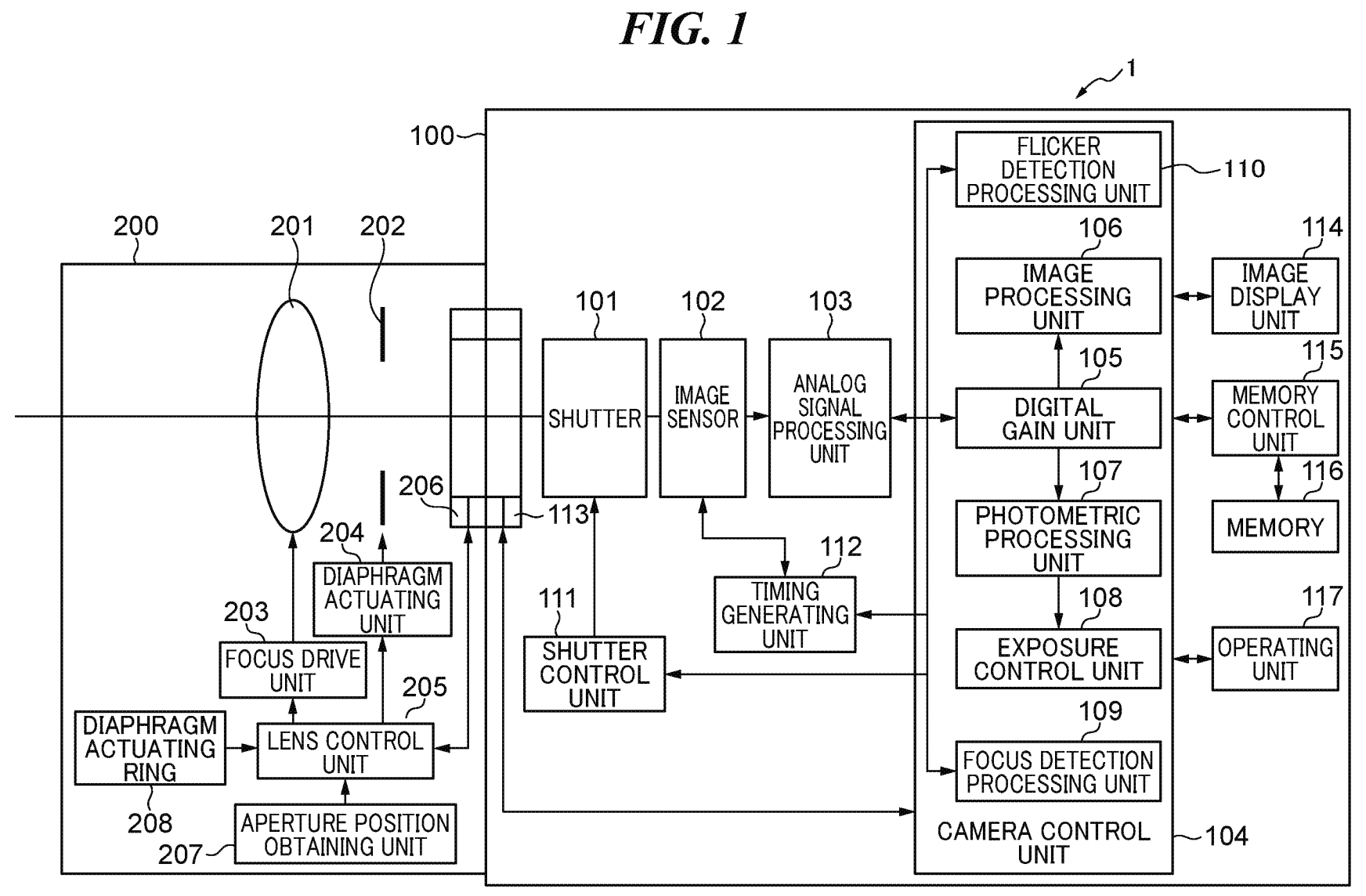

FIG. 1 is a block diagram showing a hardware configuration of a camera system according to each exemplary embodiment.

Referring to FIG. 1, the camera system 1 is comprised of a camera 100 (pickup apparatus) and a lens unit 200 (lens apparatus).

The camera 100 has a shutter 101, an image sensor 102, an analog signal processing unit 103, a camera control unit 104, a shutter control unit 111, a timing generating unit 112, a communication terminal 113, an image display unit 114, a memory control unit 115, a memory 116, and an operating unit 117.

The shutter 101 is provided to control the incidence of a bundle of rays from the lens unit 200 on the image sensor 102 and is normally open. The shutter 101 is controlled by the camera control unit 104 through the shutter control unit 111 and has a so-called mechanical shutter function of setting the time for which a bundle of rays falls on the image sensor 102.

The image sensor 102 such as a CMOS or a CCD sensor, which captures an image of a subject, is operated based on timing signals output from the timing generating unit 112 and performs photoelectric conversion of an optical image of a subject into an analog signal. The image sensor 102 has a plurality of focus detection pixels that performs photoelectric conversion of an image formed by a bundle of rays split from a bundle of rays from the lens unit 200 in addition to image capturing pixels. The timing generating unit 112 is controlled by the camera control unit 104 and has a so-called electronic shutter function of setting the time for which a bundle of rays falls on the image sensor 102.

The analog signal processing unit 103 converts an analog signal from the image sensor 102 into a digital signal by A/D conversion and outputs the digital signal.

The camera control unit 104 is a microcomputer comprised of a CPU, a ROM, and a RAM and executes programs stored in the ROM. The camera control unit 104 controls the components included in the camera 100. For example, the camera control unit 104 performs digital signal processing, which will be described later, on a digital signal output from the analog signal processing unit 103 and stores the digital signal in the memory 116 through the memory control unit 115. The camera control unit 104 has a software configuration for the digital signal processing, which is comprised of a digital gain unit 105, an image processing unit 106, a photometric processing unit 107, an exposure control unit 108, a focus detection processing unit 109, and a flicker detection processing unit 110.

The digital gain unit 105 adds digital gain to a digital signal and outputs the digital signal to the image processing unit 106. The image processing unit 106 performs various types of digital signal processing e.g. image interpolation processing and color conversion processing. The photometric processing unit 107 (photometric value calculation unit) calculates the brightness (photometric value) of a subject image from the digital signal output from the digital gain unit 105.

The exposure control unit 108 (aperture value calculation unit) outputs exposure control values comprised of an aperture value (Av), a shutter speed (Tv), a gain amount (Sv), and so forth based on the photometric value output from the photometric processing unit 107. Here, the aperture value (Av) is a value for controlling the aperture of a diaphragm 202 in the lens unit 200, which will be described later. The shutter speed (Tv) is a value for controlling the time for which a bundle of rays falls on the image sensor 102 using the electronic shutter function and the mechanical shutter function described above. The amount of gain (Sv) is a value that represents the amount of gain that is added in a gain adding process carried out by the analog signal processing unit 103 or the digital gain unit 105.

The focus detection processing unit 109 detects a phase difference between a pair of images based on digital signals from the focus detection pixels output from the analog signal processing unit 103 and carries out a focus detection process for an image pickup optical system based on the detected phase difference. The flicker detection processing unit 110 carries out a process in which it detects the frequency of a flicker light source using data on a successively-shot frame images as digital signals output from the analog signal processing unit 103.

The image display unit 114 is a rear monitor for displaying images and shooting information and is an image display device such as an LCD. The operating unit 117 is an input unit that receives operations from a user and comprised of various operating members. The operating unit 117 has a camera power switch, an AF (autofocus) instruction button, a shooting instruction button, a flicker light source detecting instruction button, and various operating buttons and outputs user's input operations to the camera control unit 104.

The lens unit 200 is an interchangeable lens unit on which taking lenses are mounted, and has a lens 201, the diaphragm 202, a focus drive unit 203, a diaphragm actuation unit 204, a lens control unit 205, a communication terminal 206, and an aperture position obtaining unit 207.

The lens 201 is a lens group comprised of taking lenses such as a focusing lens and a zoom lens and captures reflected light entering from a subject into the camera 100. The diaphragm 202 adjusts the amount of light during shooting with the camera 100 (the amount of light received by the image sensor 102 during shooting) by adjusting its opening diameter (aperture). The opening diameter of the diaphragm 202 is controlled by the lens control unit 205 (aperture control unit) through the diaphragm actuation unit 204.

The communication terminals 113 and 206 are communication terminals of the camera 100 and the lens unit 200, respectively, and connecting the communication terminals 113 and 206 together enables the camera 100 and the lens unit 200 to communicate with each other.

In response to an instruction from the lens control unit 205, the focus drive unit 203 adjusts the focus of the lens 201 by changing the position of the lens 201. The lens control unit 205 controls the components included in the lens unit 200. The lens control unit 205 is also capable of obtaining an effective f-number (effective aperture value) based on positional information about the diaphragm 202 from the aperture position obtaining unit 207 and communicating the obtained effective f-number to the camera 100. The lens control unit 205 is also capable of switching between the following diaphragm control modes: a mode in which diaphragm actuation is implemented by communication with the camera 100, and a mode in which diaphragm actuation is implemented by operating a diaphragm actuating ring 208 (aperture value setting member) which the lens unit 200 has. In the following description, the mode in which diaphragm actuation is implemented by operating the diaphragm actuating ring 208 which the lens unit 200 has is referred to as a manual aperture mode (first mode), and the mode in which diaphragm actuation is implemented by communication with the camera 100 is referred to as an auto aperture mode (second mode).

FIG. 2 is an external view of the lens unit 200 equipped with the diaphragm actuating ring 208 in FIG. 1.

As shown in FIG. 2, a graduation 209 is provided on the diaphragm actuating ring 208, and the diaphragm actuating ring 208 is configured to be rotated with respect to a housing for the lens unit 200 by user operations in two directions indicated by arrows about a shooting optical axis indicated by a dotted line. A plurality of aperture values (f-numbers) that can be set by the user is printed on the housing for the lens unit 200. The word "Auto" indicating that an aperture value is set on the camera 100 side, not by the user, is also printed on the housing of the lens unit 200.

By rotating the diaphragm actuating ring 208 to set the graduation 209 to one of the aperture values printed on the housing for the lens unit 200, the user is able to set an aperture value which the lens control unit 205 will be notified of. It should be noted that when the user sets the graduation 209 to the word "Auto" printed on the housing for the lens unit 200, the lens control unit 205 goes into the auto aperture mode. In the manual aperture mode, the lens control unit 205 controls the opening diameter of the diaphragm 202 through the diaphragm actuation unit 204 such that an aperture value set by the user rotating the diaphragm actuating ring 208 (hereafter referred to as the set aperture value (first aperture value)) is achieved. In the auto aperture mode, the lens control unit 205 controls the opening diameter of the diaphragm 202 through the diaphragm actuation unit 204 such that a target aperture value (second aperture value) sent from the camera 100 is set although the details thereof will be described later.

Image Pickup Operation of the Camera 100

Referring to FIG. 3, a description will now be given of an image pickup operation during a Live View operation of the camera 100 according to each exemplary embodiment.

Frame images 305 to 309 in FIG. 3 are image data comprised of digital signals that are generated by the analog signal processing unit 103 based on electric charges accumulated in the image sensor 102 and read out by the camera control unit 104 (image obtaining unit).

Photometric calculations 310 and 311 are processes that are carried out by the photometric processing unit 107 under the control of the camera control unit 104 and calculate brightness values (photometric values) of subject images from the respective frame images 305 and 306.

Exposure calculations 312 and 313 are processes that are carried out by the exposure control unit 108 under the control of the camera control unit 104 and calculate exposure control values based on the photometric values calculated by the respective photometric calculations 310 and 311 and a program diagram stored in advance in the ROM. As described above, the exposure control values are comprised of the aperture value (Av) of the diaphragm 202, the time (Tv) for which a bundle of rays falls on the image sensor 102, and the amount of gain (Sv) to be added by the analog signal processing unit 103 or the digital gain unit 105.

Exposure settings 314 and 315 are processes that are carried out by the camera control unit 104 and send the exposure control values Av, Tv, and Sv calculated by each of the exposure calculations 312 and 313 to the image sensor 102, the analog signal processing unit 103, and the digital gain unit 105. As a result, the exposure control values Av, Tv, and Sv calculated by each of the exposure calculations 312 and 313 are set such that they are reflected in each of the frame images 308 and 309.

In a case where an aperture control subject determined in an aperture control subject determination process, which will be described later, is the camera 100, the exposure settings 314 and 315 send an instruction to switch the aperture control subject to the camera 100 and the Av values (target aperture values) calculated by the respective exposure calculations 312 and 313 to the lens control unit 205. In this case, the lens control unit 205 sets the aperture control mode to the auto aperture mode and sets the effective aperture value to the target aperture value sent from the camera 100. On the other hand, in a case where the aperture control subject determined in the aperture control subject determination process is the lens unit 200, the exposure settings 314 and 315 do not send the Av values calculated by the respective exposure calculations 312 and 313 to the lens control unit 205. In this case, the lens control unit 205 sets the aperture control mode to the manual aperture mode and sets the effective aperture value to the set aperture value that is sent from the diaphragm actuating ring 208 when the diaphragm actuating ring 208 is operated.

As shown in FIG. 3, the photometric calculation 310 and the exposure calculation 312 for the frame image 305 are performed during an interval between vertical driving pulses (VDs) 301 and 302 output from the timing generating unit 112, and the exposure setting 314 is performed during an interval between VDs 302 and 303. The exposure control values set by the exposure setting 314 are reflected in the frame image 308 that is image data accumulated during an interval between VDs 303 and 304.

Likewise, the photometric calculation 311 and the exposure calculation 313 for the frame image 306 are performed during the interval between the VDs 302 and 303, and the exposure setting 315 is performed during the interval between the VDs 303 and 304. The exposure control values set by the exposure setting 315 are reflected in the frame image 309.

As described above, exposure for the subsequently-generated frame images 308 and 309 is controlled based on the photometric values and the exposure control values calculated from the frame images 305 and 306. As a result, frame images with appropriate exposure for changes in the brightness of a subject image are obtained.

Aperture Control Process for the Camera 100

Referring to a flowchart of FIG. 4, a description will now be given of an aperture control process during a Live View operation of the camera 100 according to each exemplary embodiment. The aperture control process described below is carried out by the camera control unit 104 controlling the components of the camera 100 in accordance with a program stored in the ROM in the camera control unit 104.

Upon detecting that the camera power switch of the operating unit 117 has been operated to be turned on, the camera control unit 104 activates the camera system 1 to start Live View and starts the aperture control process, which is a part of the exposure calculations and the exposure settings in FIG. 3. Specifically, the aperture control process is carried out in the camera control unit 104 by the CPU loading the program from the ROM into the RAM. In the following description, it is assumed that the camera control unit 104 carries out the present process. It should be noted that when the camera system 1 is activated, the lens control unit 205 sets the aperture control mode to the manual aperture mode.

Figure 4:
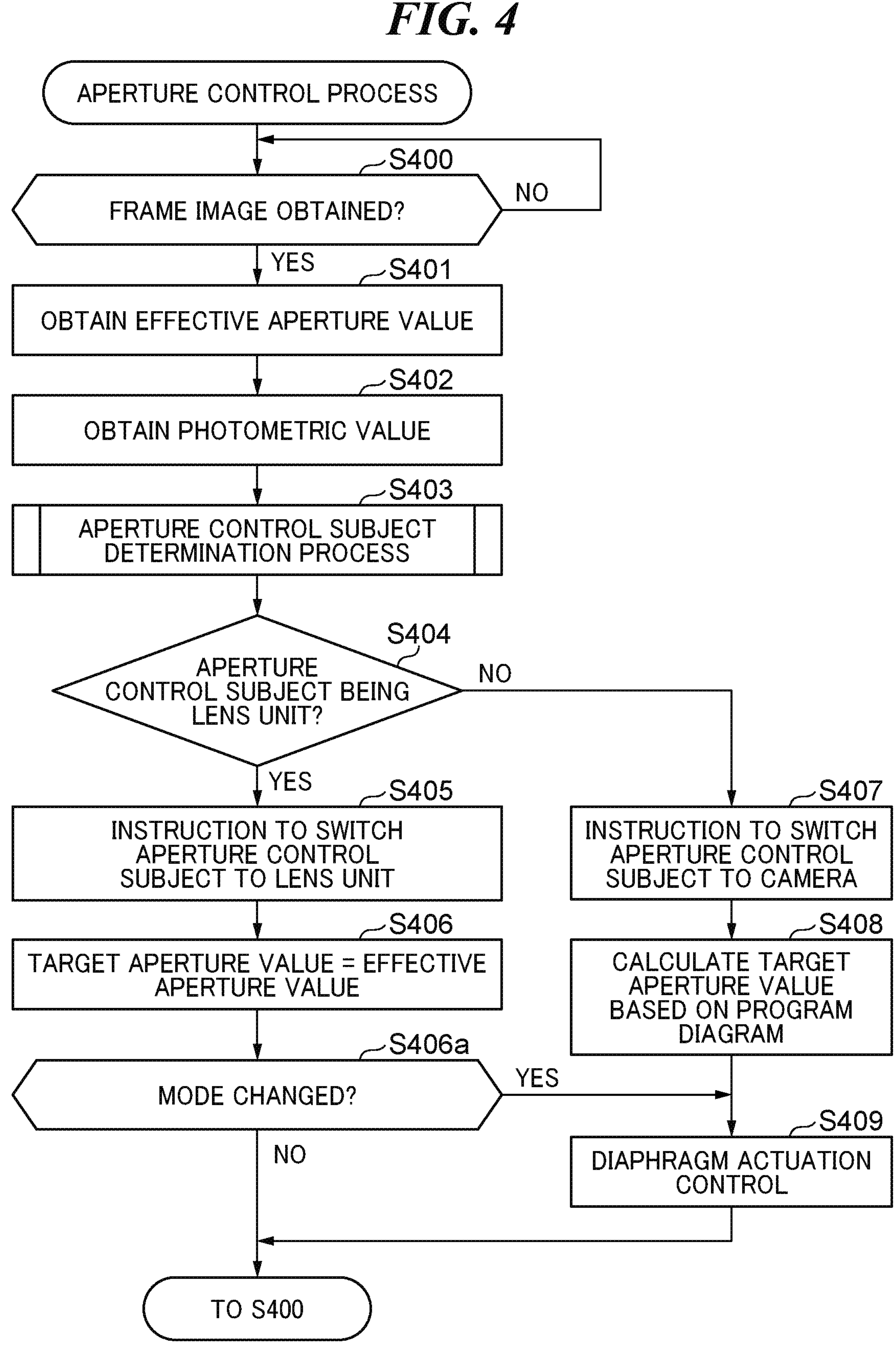
FIG. 4 is a flowchart of an aperture control process during a Live View operation of the camera according to each exemplary embodiment.

Referring to FIG. 4, first, the camera control unit 104 reads out electric charges accumulated in the image sensor 102 and obtains one frame image (YES in step S400), and the process proceeds to step S401.

Next, in step S401, the camera control unit 104 (aperture value obtaining unit) obtains an effective aperture value from the lens unit 200 through the communication terminal 113.

Then, in step S402, the camera control unit 104 instructs the photometric processing unit 107 to perform a photometric calculation and obtains a photometric value as a calculation result.

After that, in step S403, the camera control unit 104 carries out the aperture control subject determination process, which will be described later with reference to FIG. 5.

Then, in step S404, when the camera control unit 104 (aperture control subject determination unit) determines that the aperture control subject is the lens unit 200 in the aperture control subject determination process in the step S403 (YES in the step S404), the process proceeds to step S405.

In the step S405, the camera control unit 104 (mode transition unit) sends a switching instruction to switch the aperture control subject to the lens unit 200, to the lens control unit 205 through the communication terminal 113. In response to the switching instruction, the lens control unit 205 transitions the lens unit 200 to the manual aperture mode in which diaphragm actuation is implemented by operating the diaphragm actuating ring 208.

Then, in step S406, the camera control unit 104 instructs the exposure control unit 108 to calculate a target aperture value, which is to be used when the diaphragm actuation unit 204 actuates the diaphragm 202. In response to this instruction, the exposure control unit 108 calculates the effective aperture value, which was calculated in the step S401, as the target aperture value and notifies the camera control unit 104 of the target aperture value. After that, the process proceeds to step **S406*a***.

In the step **S406*a*, the camera control unit 104 inquires of the lens unit 200 about whether or not the aperture control mode was changed from the auto aperture mode to the manual aperture mode in the step S405. As a result of this inquiry, in a case where the aperture control mode was changed (YES in the step S406*a*), the process proceeds to step S409. In this case, the camera control unit 104 (forced control unit) issues a diaphragm actuating instruction in the step S409 to forcibly control the lens control unit 205 through the communication terminal 113 such that the aperture value of the diaphragm 202 is the effective aperture value obtained in the step S401. The process then returns to the step S400. On the other hand, in a case where the aperture control mode was not changed, and the lens unit 200 is still in the manual aperture mode set at the start of the present process (NO in the step S406***a*), the process directly returns to the step S400.

It should be noted that the process may directly return from the step S406 to the step S400 without the inquiry in the step S406*a* being made. In this case, however, the user is to operate the diaphragm actuating ring 208 as appropriate to set a desired aperture value.

On the other hand, when the camera control unit 104 determines that the aperture control subject is the camera 100 in the aperture control subject determination process in the step S403 (NO in the step S404), the process proceeds to step S407.

In the step S407, the camera control unit 104 (forced control unit) sends a switching instruction to switch the aperture control subject to the camera 100, to the lens control unit 205 through the communication terminal 113. In response to this switching instruction, the lens control unit 205 transitions to the auto aperture mode in which diaphragm actuation is implemented by communication with the camera 100. Namely, in the auto aperture mode, the camera control unit 104 forcibly controls the lens control unit 205 such that the effective aperture value is the target aperture value, not the set aperture value.

Then, in step S408, the camera control unit 104 instructs the exposure control unit 108 to calculate a target aperture value, which is targeted when the diaphragm actuation unit 204 actuates the diaphragm 202. In response to this instruction, the exposure control unit 108 calculates the target aperture value based on the photometric value obtained in the step S402 and the program diagram stored in the ROM in advance and notifies the camera control unit 104 of the target aperture value. In this case, in the step S409, the camera control unit 104 (forced control unit) issues a diaphragm actuating instruction to forcibly control the lens control unit 205 through the communication terminal 113 such that the target aperture value which the lens control unit 104 was notified of in the step S408 is achieved. After that, the process returns to the step S400.

Aperture Control Subject Determination Process

Referring to a flowchart of FIG. 5, a description will now be given of the aperture control subject determination process in the step S403 in FIG. 4. The aperture control subject determination process described below is carried out by the camera control unit 104 controlling the components of the camera 100 in accordance with a program stored in the ROM in the camera control unit 104.

Figure 5:
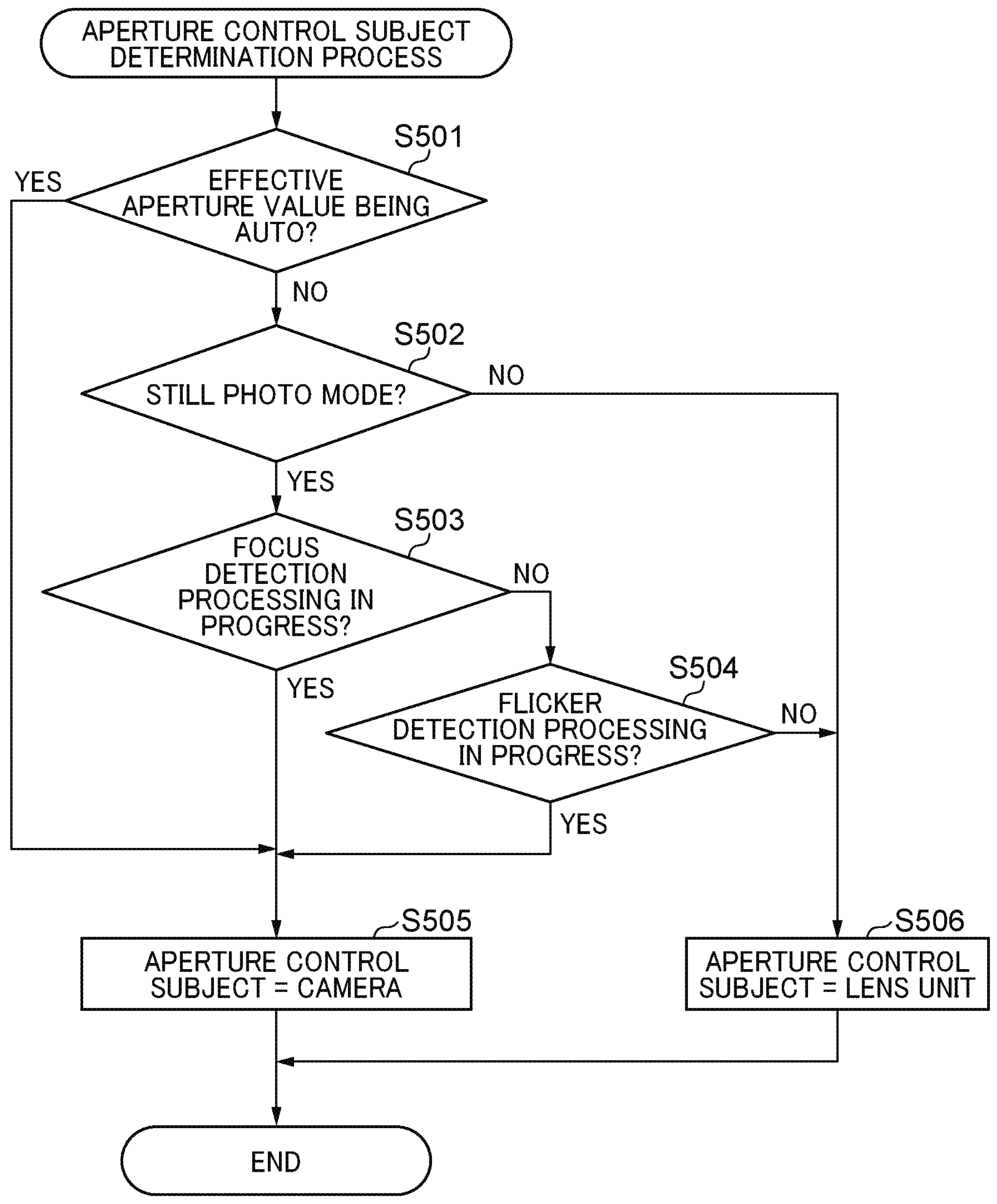
FIG. 5 is a flowchart of an aperture control subject determination process in FIG. 4.

Referring to FIG. 5, first, in step S501, the camera control unit 104 determines whether or not the effective aperture value obtained in the step S401 is Auto. When it is determined that the effective aperture value is Auto (YES in the step S501), the diaphragm 202 should be actuated based on only an instruction from the camera 100 because no aperture value is set on the lens unit 200 side by the user. For this reason, when the camera control unit 104 makes this determination, the process proceeds to step S505, in which the camera control unit 104 sets the control subject for the diaphragm 202 to the camera 100 and ends the present process. On the other hand, when the camera control unit 104 determines that the effective aperture value is not Auto (NO in the step S501), the process proceeds to step S502.

In the step S502, the camera control unit 104 determines whether or not a shooting mode set for the camera 100 is a still image shooting mode, and when it is determined that the shooting mode is the still image shooting mode (YES in the step S502), the process proceeds to step S503. On the other hand, when it is determined that the shooting mode is not the still image shooting mode (NO in the step S502), the shooting mode is assumed to be a mode in which a process of changing scenes is recorded by recording successively-shot frame images like a movie mode. Thus, the process proceeds to step S506 to speed up response to a user's operation of changing an aperture value setting via the diaphragm actuating ring 208, and the control subject for the diaphragm 202 is set to the lens unit 200, followed by the present process being ended.

Then, in the step S503, the camera control unit 104 determines whether or not the camera 100 is currently carrying out the focus detection process. Specifically, when the user issues an AF instruction via the AF instruction button the operating unit 117 has, the camera control unit 104 determines in the step S503 that the camera 100 is currently carrying out the focus detection process.

When the camera control unit 104 determines that the camera 100 is currently carrying out the focus detection process (YES in the step S503), the process proceeds to step S505, in which the control subject for the diaphragm 202 is set to the camera 100, and the present process is then ended. This is intended to enable the camera 100 to control the diaphragm 202 such that an aperture suitable for the focus detection process is achieved because it is generally known that the detection accuracy in the focus detection process using the imaging face phase-difference AF decreases when the aperture is small.

On the other hand, when the camera control unit 104 determines that the camera 100 is not currently carrying out the focus detection process (NO in the step S503), the process proceeds to step S504.

In the step S504, the camera control unit 104 determines whether or not the camera 100 is currently carrying out the flicker light source detection process. Specifically, when the user issues a flicker light source detection instruction via the flicker light source detection instruction button which the operating unit 117 has, the camera control unit 104 determines in the step S504 that the camera 100 is currently carrying out the flicker light source detection process.

When the camera control unit 104 determines that the camera 100 is currently carrying out the flicker light source detection process (YES in the step S504), the process proceeds to the step S505, in which the control subject for the diaphragm 202 is set to the camera 100, followed by the present process being ended. This is intended to enable the camera 100 to control the diaphragm 202 such that an aperture suitable for the flicker light source detection process is achieved because in the flicker light source process, an image with proper brightness cannot be obtained depending on the brightness of a subject image, resulting in the detection accuracy being decreased.

On the other hand, when the camera control unit 104 determines that the camera 100 is not currently carrying out the flicker light source detection process (NO in the step S504), it is assumed that the camera 100 is in a steady shooting standby state in which no special processing is being performed on the camera 100 side in the still image shooting mode. Thus, the process proceeds to the step S506 so as to speed up response to a user's operation of changing an aperture value setting via the diaphragm actuating ring 208, and the control subject for the diaphragm 202 is set to the lens unit 200, followed by the present process being ended.

Figure 6A:
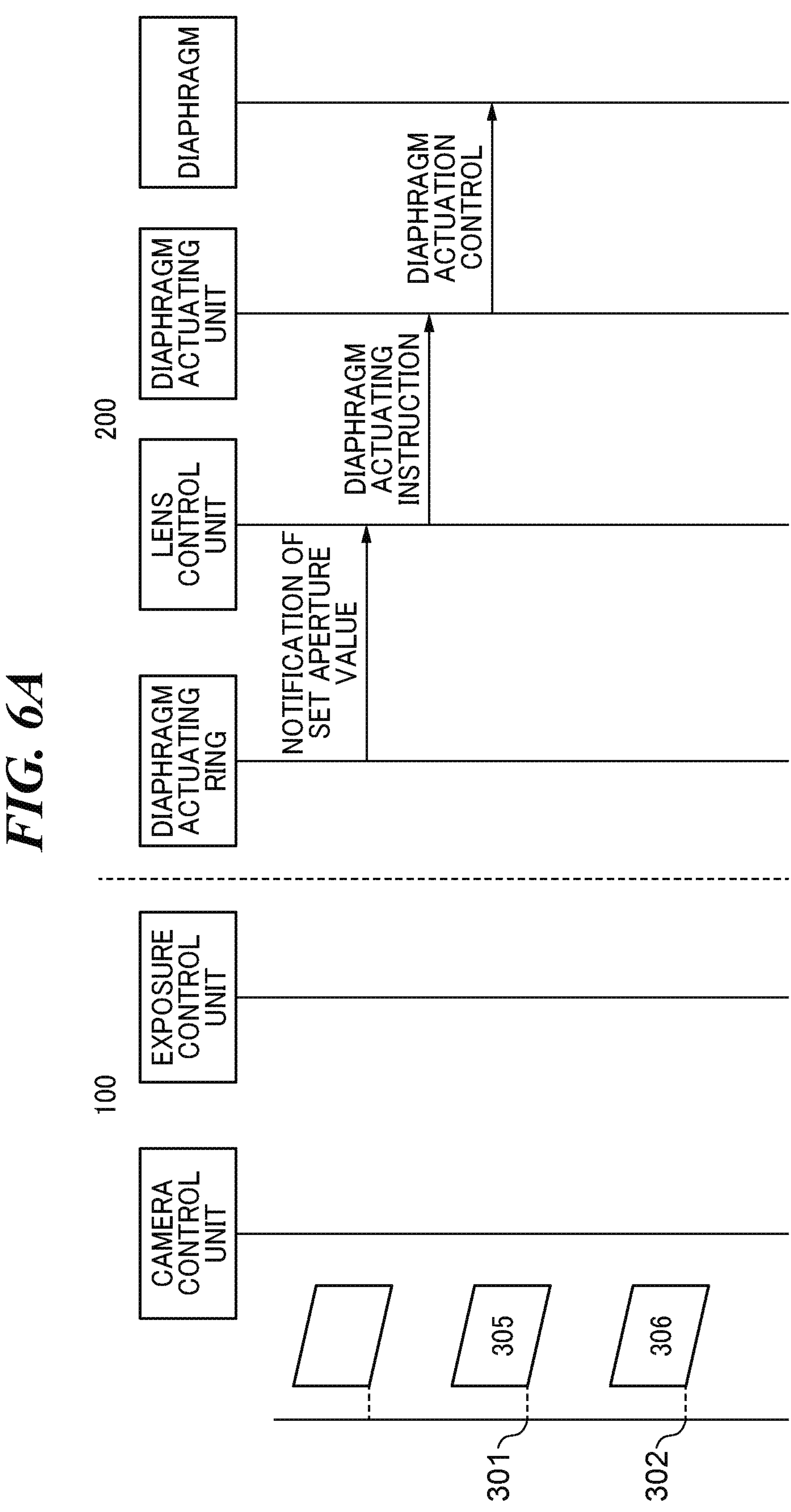
FIG. 6A is a sequence diagram of a diaphragm actuation control process in the camera system in a case where an aperture control subject is set to a lens unit in the aperture control subject determination process in FIG. 5.

As described above with reference to FIG. 4 and FIG. 5, in the present embodiment, there are the case where the control subject for the diaphragm 202 in the image pickup operation using the camera 100 is set to the camera 100, and the case where the control subject for the diaphragm 202 in the image pickup operation using the camera 100 is set to the lens unit 200. Referring to FIG. 6A and FIG. 6B, a description will now be given of the flows of processing in diaphragm actuation control in the respective cases to demonstrate the usefulness thereof.

FIG. 6A is a sequence diagram of a diaphragm actuation control process in the camera system 1 in the case where the aperture control subject is set to the lens unit 200 in the aperture control subject determination process in FIG. 5. FIG. 6B is a sequence diagram of a diaphragm drive control process in the camera system 1 in the case where the aperture control subject is set to the camera 100 in the aperture control subject determination process in FIG. 5.

For example, when the camera 100 is in a movie shooting mode, the control subject for the diaphragm 202 is set to the lens unit 200 in the aperture control subject determination process in FIG. 5. In this case, as shown in FIG. 6A, when the diaphragm actuating ring 208 notifies the lens control unit 205 of an aperture value (set aperture value) of the diaphragm 202 set through a rotating operation by the user, the lens control unit 205 immediately actuates the diaphragm 202 through the diaphragm actuation unit 204. Thus, in response to an aperture changing instruction issued from the user to the diaphragm actuating ring 208, the diaphragm 202 is actuated in a responsive manner. This is useful in a shooting mode like a movie mode in which a process of changing scenes is recorded by continuously recording successively-shot images.

On the other hand, when the camera 100 is in a mode in which a singly-shot image is recorded like a still image shooting mode, and the focus detection process (AF processing) or the flicker detection process is in progress, the control subject for the diaphragm 202 is set to the camera 100 in the aperture control subject determination process in FIG. 5. In this case, as shown in FIG. 6B, an aperture value (set aperture value) of the diaphragm 202 set through a rotating operation by the user is sent as an effective aperture value to the camera 100 through the lens control unit 205 as above. On the camera 100 side, when the exposure control unit 108 calculates a target aperture value based on the photometric value obtained in the step S402 and the program diagram stored in the ROM in advance, without using the effective aperture value sent from the lens unit 200, the camera control unit 104 sends the target aperture value as well as a diaphragm actuation request to the lens unit 200. Upon receiving the diaphragm actuation request and the target aperture value from the camera 100 side, the lens control unit 205 actuates the diaphragm 202 through the diaphragm actuation unit 204. Thus, the camera control unit 104 is able to control the aperture to an aperture (for example, a wide aperture) suitable for a process being in progress (for example, the focus detection process) as appropriate. This control records a singly-shot image and is thus useful because performance degradation in terms of specific camera functions can be reduced in the still image shooting mode in which relatively low responsiveness of the actuation of the diaphragm 202 to the rotation of the diaphragm actuating ring 208 by the user is used.

It should be noted that a mode notification icon (mode display unit) indicating whether the present aperture control mode in the lens unit 200 is the manual aperture mode or the auto aperture mode may be displayed on the image display unit 114 of the camera 100. For example, there is a case where the user sets an aperture value by operating the diaphragm actuating ring 208 in the manual aperture mode during a Live View operation and then presses the AF instruction button in the still image shooting mode. In this case, the aperture control mode automatically switches from the manual aperture mode to the auto aperture mode, and the displayed mode notification icon allows the user to immediately know that the automatic switching to the auto aperture mode has taken place.

When the automatic switching to the auto aperture mode takes place in the step S407, an effective aperture value obtained in the step S401 before the automatic switching and an effective aperture value (target aperture value) after the diaphragm actuation control in the step S409 may be displayed on the image display unit 114 (aperture value display unit). As a result, in a case where, for example, the effective aperture value obtained in the step S401 before the automatic switching is a set aperture value manually set by the user with the diaphragm actuating ring 208, the user easily recognizes how much the effective aperture value has changed from the set aperture value as a result of the automatic switching.

Moreover, when the automatic switching to the auto aperture mode takes place in the step S407, a warning message saying, for example, "Manual aperture setting is not currently available" (warning display unit) may be displayed on the image display unit 114. This allows the user to recognize that an effective aperture value cannot be changed by rotating the diaphragm actuating ring 208 while the warning message is being displayed.

Furthermore, when the aperture control mode is changed from the auto aperture mode to the manual aperture mode during a Live View operation (YES in the step S406*a*), the display of the above warning message may be ended after the aperture value of the diaphragm 202 returns to the effective aperture value, which was obtained in the step S401, in the step S409. Thus, after the display of the above warning message is ended, the user is able to quickly perform a shooting process in the still image shooting mode with a user-desired aperture value set manually before the above automatic switching without rotating the diaphragm actuating ring 208.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-055672 filed on Mar. 30, 2023 which is hereby incorporated by reference herein in its entirety.

What is claimed is:

1. A system comprising a lens apparatus and a pickup apparatus that are capable of communicating with each other, wherein the lens apparatus comprises a diaphragm that adjusts an amount of light during shooting with the pickup apparatus, and the pickup apparatus comprises a sensor, the lens apparatus further comprising:

a setting member that sets a first aperture value according to a user operation;

at least one processor; and a memory coupled to the at least one processor, the memory having instructions that, when executed by the at least one processor, perform the operations as:

an aperture control unit that controls the diaphragm such that in a first mode, an effective aperture value is the first aperture value, the pickup apparatus further comprising:

at least one processor; and a memory coupled to the at least one processor, the memory having instructions that, when executed by the at least one processor, perform the operations as:

an image obtaining unit that obtains a frame image by taking an image of a subject with the sensor during a Live View operation in a state where the amount of light received is adjusted by the diaphragm;

a photometric value calculation unit that calculates a photometric value from the frame image;

an aperture value calculation unit that calculates an aperture value according to the photometric value;

a determination unit that determines whether a control subject is the lens apparatus or the pickup apparatus according to a shooting mode during the Live View operation;

a transition unit that, in a case where the determined diaphragm control subject is the pickup apparatus, determines an aperture value calculated by the aperture value calculation unit as a second aperture value, and transitions the lens apparatus to a second mode; and a forced control unit that, in a case where the transition unit transitions the lens apparatus to the second mode, forcibly controls the aperture control unit such that the effective aperture value is not the first aperture value but the determined second aperture value.

2. The system according to claim 1, wherein in a case where the shooting mode is a mode in which shot images are successively recorded, the determination unit determines the control subject to be the lens apparatus, and the forced control unit transitions the lens apparatus to the first mode.

3. The system according to claim 1, wherein in a case where the shooting mode is a mode in which a shot image is singly recorded, and AF processing is in progress, the determination unit determines the control subject to be the pickup apparatus.

4. The system according to claim 3, wherein in a case where the shooting mode is the mode in which a shot image is singly recorded, and detection processing is in progress, the determination unit determines the control subject to be the pickup apparatus.

5. The system according to claim 3, wherein in a case where the AF processing has ended, the determination unit determines the control subject to be the lens apparatus.

6. The system according to claim 4, wherein in a case where the detection processing has ended, the determination unit determines the control subject to be the lens apparatus.

7. The system according to claim 1, the pickup apparatus further comprising a second obtaining unit that obtains the effective aperture value from the lens apparatus before the determination unit determines the control subject, wherein during the Live View operation, in a case where the transition unit transitions the lens apparatus to the second mode and then transitions the lens apparatus to the first mode, the forced control unit forcibly controls the aperture control unit such that the effective aperture value is the first aperture value obtained by the aperture value obtaining unit.

8. The system according to claim 7, the pickup apparatus further comprising a mode display unit that, during the Live View operation, indicates whether the shooting mode is the first mode or the second mode.

9. The system according to claim 7, the pickup apparatus further comprising an aperture value display unit that, in the second mode, displays the effective aperture value obtained by the aperture value obtaining unit and the second aperture value.

10. The system according to claim 7, the pickup apparatus further comprising a warning display unit that, in the second mode, displays a warning indicating that the effective aperture value will not be changed in response to a user operation to the aperture value setting member.

11. The system according to claim 10, wherein during the Live View operation, in a case where the transition unit transitions the lens apparatus to the second mode and then transitions the lens apparatus to the first mode, the display of the warning by the warning display unit is ended after the forced control unit forcibly controls the aperture control unit such that the effective aperture value is the first aperture value obtained by the aperture value obtaining unit.

12. A pickup apparatus that connects to a lens apparatus such that they are able to communicate with each other, wherein the pickup apparatus comprises a sensor, and the lens apparatus comprises a diaphragm that adjusts an amount of light during shooting with the pickup apparatus, and in a first mode, controls the diaphragm such that an effective aperture value of the diaphragm is a first aperture value that is set according to a user operation, the pickup apparatus comprising:

at least one processor; and a memory coupled to the at least one processor, the memory having instructions that, when executed by the at least one processor, perform the operations as:

an image obtaining unit that obtains a frame image by taking an image of a subject with the sensor during a Live View operation in a state where the amount of light received is adjusted by the diaphragm;

a photometric value calculation unit that calculates a photometric value from the frame image;

an aperture value calculation unit that calculates an aperture value according to the photometric value;

a determination unit that determines whether an control subject is the lens apparatus or the pickup apparatus according to a shooting mode during the Live View operation;

a transition unit that, when the determined control subject is the pickup apparatus, determines an aperture value calculated by the aperture value calculation unit as a second aperture value, and transitions the lens apparatus to a second mode; and a forced control unit that, when the transition unit transitions the lens apparatus to the second mode, forcibly controls the lens apparatus such that the effective aperture value is not the first aperture value but the determined second aperture value.

13. A method for a system comprising a lens apparatus and a pickup apparatus that are capable of communicating with each other, wherein the lens apparatus comprises a diaphragm that adjusts an amount of light during shooting with the pickup apparatus, and the pickup apparatus comprises a sensor, the method comprising:

setting, in the lens apparatus, a first aperture value according to a user operation; and controlling, in the lens apparatus, the diaphragm such that in a first mode, an effective aperture value is the first aperture value, obtaining, in the pickup apparatus, a frame image by taking an image of a subject with the sensor during a Live View operation in a state where the amount of light received is adjusted by the diaphragm;

calculating, in the pickup apparatus, a photometric value from the frame image;

calculating, in the pickup apparatus, an aperture value according to the photometric value;

determining, in the pickup apparatus, whether a control subject is the lens apparatus or the pickup apparatus according to a shooting mode during the Live View operation;

determining, in the pickup apparatus, in a case where the determined control subject is the pickup apparatus, the aperture value calculated in the calculating as a second aperture value, and transitioning the lens apparatus to a second mode; and forcibly controlling, in the pickup apparatus, in a case where the lens apparatus is transitioned to the second mode, such that the effective aperture value is not the first aperture value but the determined second aperture value.

14. A method for a pickup apparatus connected to a lens apparatus such that they are able to communicate with each other, wherein the pickup apparatus comprises a sensor, and the lens apparatus comprises a diaphragm that adjusts the amount of light during shooting with the pickup apparatus, and in a first mode, controls the diaphragm such that an effective aperture value is a first aperture value that is set according to a user operation, the method comprising:

obtaining a frame image by taking an image of a subject with the sensor during a Live View operation in a state where an amount of light received is adjusted by the diaphragm;

calculating a photometric value from the frame image;

calculating an aperture value according to the photometric value;

determining whether a control subject is the lens apparatus or the pickup apparatus according to a shooting mode during the Live View operation;

determining, in a case where the determined control subject is the pickup apparatus, the aperture value calculated in the calculating as a second aperture value, and transitioning the lens apparatus to a second mode; and forcibly controlling, in a case where the lens apparatus is transitioned to the second mode, the lens apparatus such that the effective aperture value is not the first aperture value but the determined second aperture value.

15. A non-transitory computer-readable storage medium storing a program that causes a computer to execute a method for a system comprising a lens apparatus and a pickup apparatus that are capable of communicating with each other, wherein the lens apparatus comprises a diaphragm that adjusts an amount of light during shooting with the pickup apparatus, and the pickup apparatus comprises a sensor, wherein the method comprises:

setting, in the lens apparatus, a first aperture value according to a user operation; and controlling, in the lens apparatus, the diaphragm such that in a first mode, an effective aperture value is the first aperture value, obtaining, in the pickup apparatus, a frame image by taking an image of a subject with the sensor during a Live View operation in a state where the amount of light received is adjusted by the diaphragm;

calculating, in the pickup apparatus, a photometric value from the frame image;

calculating, in the pickup apparatus, an aperture value according to the photometric value;

determining, in the pickup apparatus, whether a control subject is the lens apparatus or the pickup apparatus according to a shooting mode during the Live View operation;

determining, in the pickup apparatus, in a case where the determined control subject is the pickup apparatus, the aperture value calculated in the calculating as a second aperture value, and transitioning the lens apparatus to a second mode; and forcibly controlling, in the pickup apparatus, in a case where the lens apparatus is transitioned to the second mode, such that the effective aperture value is not the first aperture value but the determined second aperture value.

16. A non-transitory computer-readable storage medium storing a program that causes a computer to execute a method for a pickup apparatus connected to a lens apparatus such that they are able to communicate with each other, wherein the pickup apparatus comprises a sensor, and the lens apparatus comprises a diaphragm that adjusts an amount of light during shooting with the pickup apparatus, and in a first mode, controls the diaphragm such that an effective aperture value of the diaphragm is a first aperture value that is set according to a user operation, and wherein the method comprises:

obtaining a frame image by taking an image of a subject with the sensor during a Live View operation in a state where the amount of light received is adjusted by the diaphragm;

calculating a photometric value from the frame image;

calculating an aperture value according to the photometric value;

determining whether a control subject is the lens apparatus or the pickup apparatus according to a shooting mode during the Live View operation;

determining, when the determined control subject is the pickup apparatus, the aperture value calculated in the calculating as a second aperture value, and transitioning the lens apparatus to a second mode; and forcibly controlling, when the lens apparatus is transitioned to the second mode, the lens apparatus such that the effective aperture value is not the first aperture value but the determined second aperture value.

* * * * *